(12) United States Patent
Won et al.

(10) Patent No.: US 11,150,806 B1
(45) Date of Patent: Oct. 19, 2021

(54) SYSTEMS AND METHODS FOR REDUCING DISK USAGE AND NETWORK LATENCY

(71) Applicant: COUPANG CORP., Seoul (KR)

(72) Inventors: Myungjae Won, Seattle, WA (US);
Zhan Chen, Bellevue, WA (US);
Xuefei Zhang, Kirkland, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/237,926

(22) Filed: Apr. 22, 2021

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC ............ *G06F 3/0608* (2013.01); *G06F 3/067* (2013.01); *G06F 3/0655* (2013.01)

(58) Field of Classification Search
CPC ....... G06F 3/0608; G06F 3/067; G06F 3/0655
See application file for complete search history.

(56) References Cited

U.S. PATENT DOCUMENTS

| | | | |
|---|---|---|---|
| 2002/0083038 A1* | 6/2002 | Berndt | G06F 16/289 |
| 2007/0050349 A1* | 3/2007 | Schreter | G06F 8/41 |
| 2018/0332016 A1* | 11/2018 | Pandey | H04L 63/108 |

* cited by examiner

*Primary Examiner* — Mark A Giardino, Jr.
(74) *Attorney, Agent, or Firm* — Finnegan, Henderson, Farabow, Garrett & Dunner, LLP

(57) ABSTRACT

Disclosed embodiments provide systems and methods for reducing disk storage and network latency. A method reducing disk storage and network latency comprises receiving customer data of a customer to store in a database, conditioning the customer data, and formatting the conditioned customer data into first and second data strings respectively having a first data type and a second data type. The method further comprises flipping a sign bit of the first data string, encoding the sign-bit-flipped first data string and second data string into serialized data by representing every two digits of the first string with one byte, and flipping all bits of the serialized data if the received customer data is represented by a negative value. The method further comprises storing the serialized data in the database if negative, receiving a request for the customer data, deserializing serialized data to be retrieved from the database, and retrieving the deserialized data from the database.

20 Claims, 11 Drawing Sheets

| Actual Number | Remove Leading and Trailing zeros | Scientific Notation | Split coefficient (C) and exponent (E) | Flip sign bit of exponent (XOR) | Encode every 2 digits with 1 byte | Flip every bit if number is negative | Serialized Data |
|---|---|---|---|---|---|---|---|
| -128 | -128 | -1.28 x 10^2 | E: 2<br>C: 1.28 | 2(0b00000010) XOR 0b10000000 = 0b10000010 | E: 0x82<br>C: 0x01 0x1c | E: 0x7d<br>C: 0xfe 0xe3 | 0x0d 0x7d 0xfe 0xe3 |
| 0.123000 | .123 | 1.23 x 10^-1 | E: -1<br>C: 1.23 | -1(0b11111111) X-OR 0b10000000 = 0b01111111 | E: 0x7f<br>C: 0x01 0x17 | N/A | 0x0f 0x7f 0x01 0x17 |

|  | Standard System | Improved System |
|---|---|---|
| 602 — SCAN p99.9 | 11.5 ms | 8.7 ms (24% decrease) |
| 604 — SCAN p99.99 | 50.3 ms | 34.7 ms (31% decrease) |
| 606 — Disk Usage | 249 MiB | 91.7 MiB (63% decrease) |

FIG. 6

SYSTEMS AND METHODS FOR REDUCING DISK USAGE AND NETWORK LATENCY

TECHNICAL FIELD

The present disclosure generally relates to computerized systems and methods for reducing disk usage and network latency. In particular, embodiments of the present disclosure relate to inventive and unconventional systems relate to reducing disk usage and latency of data retrieval from a storage database by serializing data and storing it in variable length.

BACKGROUND

Databases and disks often encompass large amounts of data to store customer information. As the amount of information relating to customers increases, there exists a need to create a process to store and retrieve the customer data more quickly without using unnecessary storage space.

Data storage and retrieval in the prior art consists of padding the data with leading zeros. This method of padding the data with leading zeros results in a bloated data size. The bloated data size results in an increase in both disk usage and network latency. Furthermore, a single data search is inefficient because the search requires iterating through the entire array of numbers for each data search. Moreover, the data loses accuracy because the number of bits used to represent the data is fixed by a maximum data length. Due to the fixed length of the resulting binary encoding, large numbers cannot be expressed with high precision.

Therefore, there is a need for improved methods and systems for reducing disk usage and network latency by serializing data in a more efficient manner.

SUMMARY

One aspect of the present disclosure is directed to a system for reducing disk usage and network latency. The computer implemented system may include one or more memory devices storing instructions. The computer-implemented system may also include one or more processors configured to execute the instructions to perform operations. The operations may comprise receiving customer data of a customer to store in a database, conditioning the customer data, formatting the conditioned customer data into first and second data strings respectively having a first data type and a second data type, and flipping a sign bit of the first data string. The operations may further comprise encoding the sign-bit-flipped first data string and second data string into serialized data by representing every two digits of the first string with one byte, flipping all bits of the serialized data if the received customer data is represented by a negative value, and storing, after flipping if the received customer data is represented by a negative value, the serialized data in the database. The operations may further comprise receiving a request for the customer data, deserializing serialized data to be retrieved from the database, and retrieving the deserialized data from the database.

Another aspect of the present disclosure is directed to a method for reducing disk usage and network latency. The method may comprise receiving customer data of a customer to store in a database, conditioning the customer data, formatting the conditioned customer data into first and second data strings respectively having a first data type and a second data type, and flipping a sign bit of the first data string. The method may further comprise encoding the sign-bit-flipped first data string and second data string into serialized data by representing every two digits of the first string with one byte, flipping all bits of the serialized data if the received customer data is represented by a negative value, and storing, after flipping if the received customer data is represented by a negative value, the serialized data in the database. The method may further comprise receiving a request for the customer data, deserializing serialized data to be retrieved from the database, and retrieving the deserialized data from the database.

Yet another aspect of the present disclosure is directed to computer-implemented system for reducing disk usage and network latency. The computer implemented system may include a database and one or more memory devices storing instructions. The computer-implemented system may also include one or more processors configured to execute the instructions to perform operations. The operations may comprise receiving customer data of a customer to store in a database, conditioning the customer data, formatting the conditioned customer data into first and second data strings respectively having a first data type and a second data type, and flipping a sign bit of the first data string. The operations may further comprise encoding the sign-bit-flipped first data string and second data string into serialized data by representing every two digits of the first string with one byte, flipping all bits of the serialized data if the received customer data is represented by a negative value, and storing, after flipping if the received customer data is represented by a negative value, the serialized data in the database. The operations may further comprise receiving a request for the customer data, deserializing serialized data to be retrieved from the database, and retrieving the deserialized data from the database.

Other systems, methods, and computer-readable media are also discussed herein.

BRIEF DESCRIPTION OF THE DRAWINGS

Figure 1B:
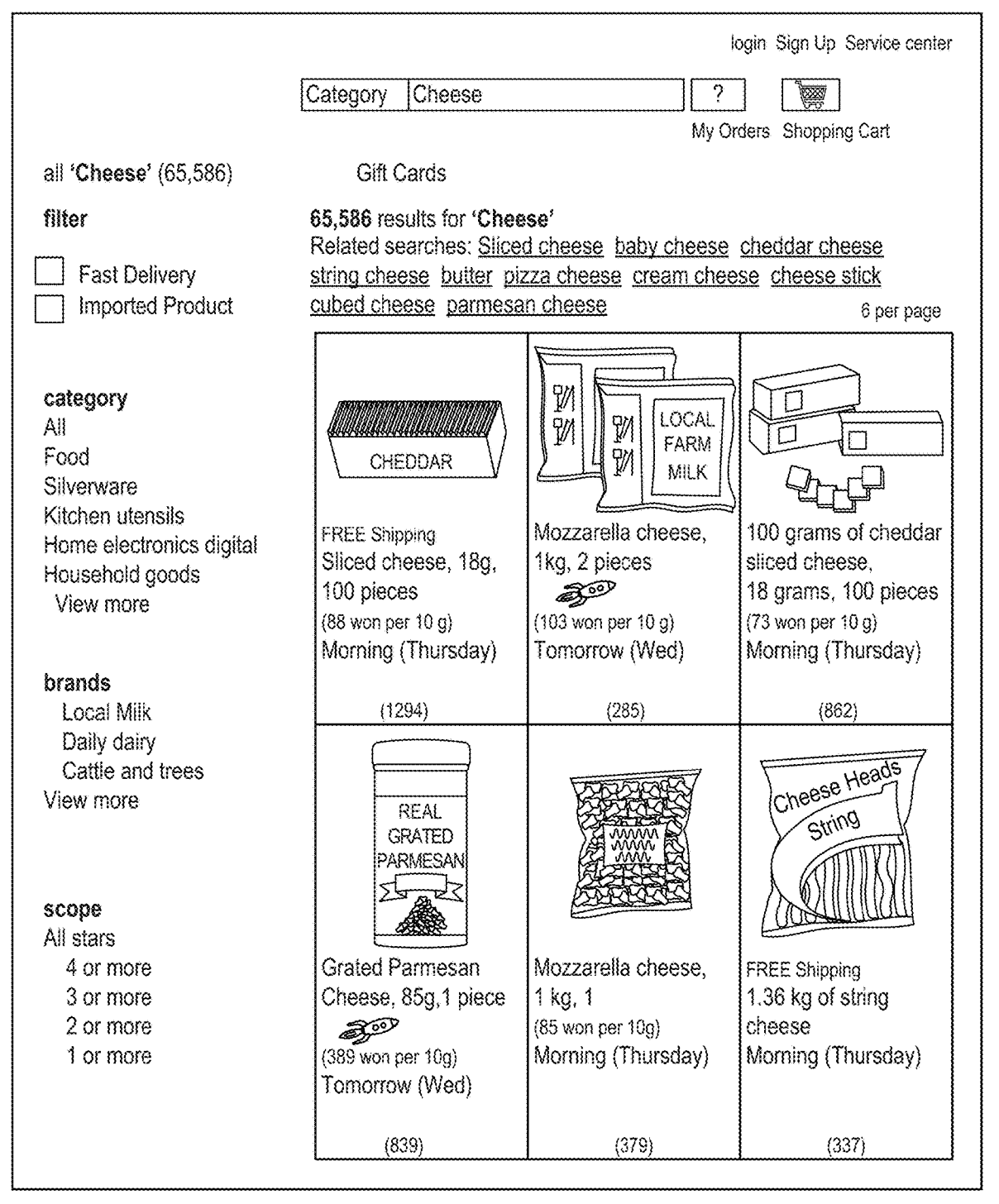
Figure 1D:
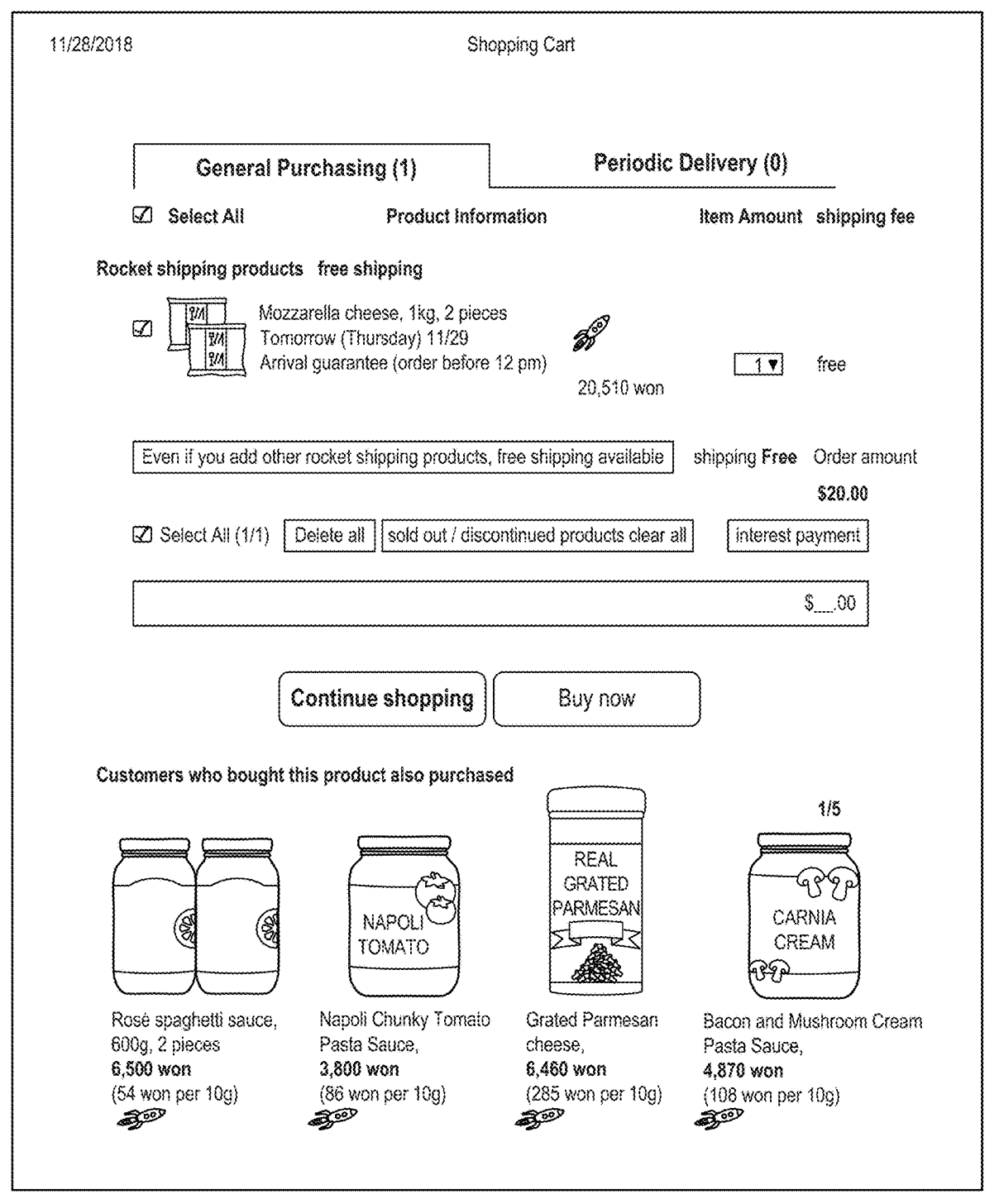

FIG. 1B depicts a sample Search Result Page (SRP) that includes one or more search results satisfying a search request along with interactive user interface elements, consistent with the disclosed embodiments.

FIG. 1D depicts a sample Cart page that includes items in a virtual shopping cart along with interactive user interface elements, consistent with the disclosed embodiments.

FIG. 5B is a table illustrating the conversion of customer data into serialized data with examples systems, consistent with the disclosed embodiments.

FIG. 6 is a table illustrating data test results between disk usage and network latency in the standard system and the improved system with data serialization.

DETAILED DESCRIPTION

Figure 1A:
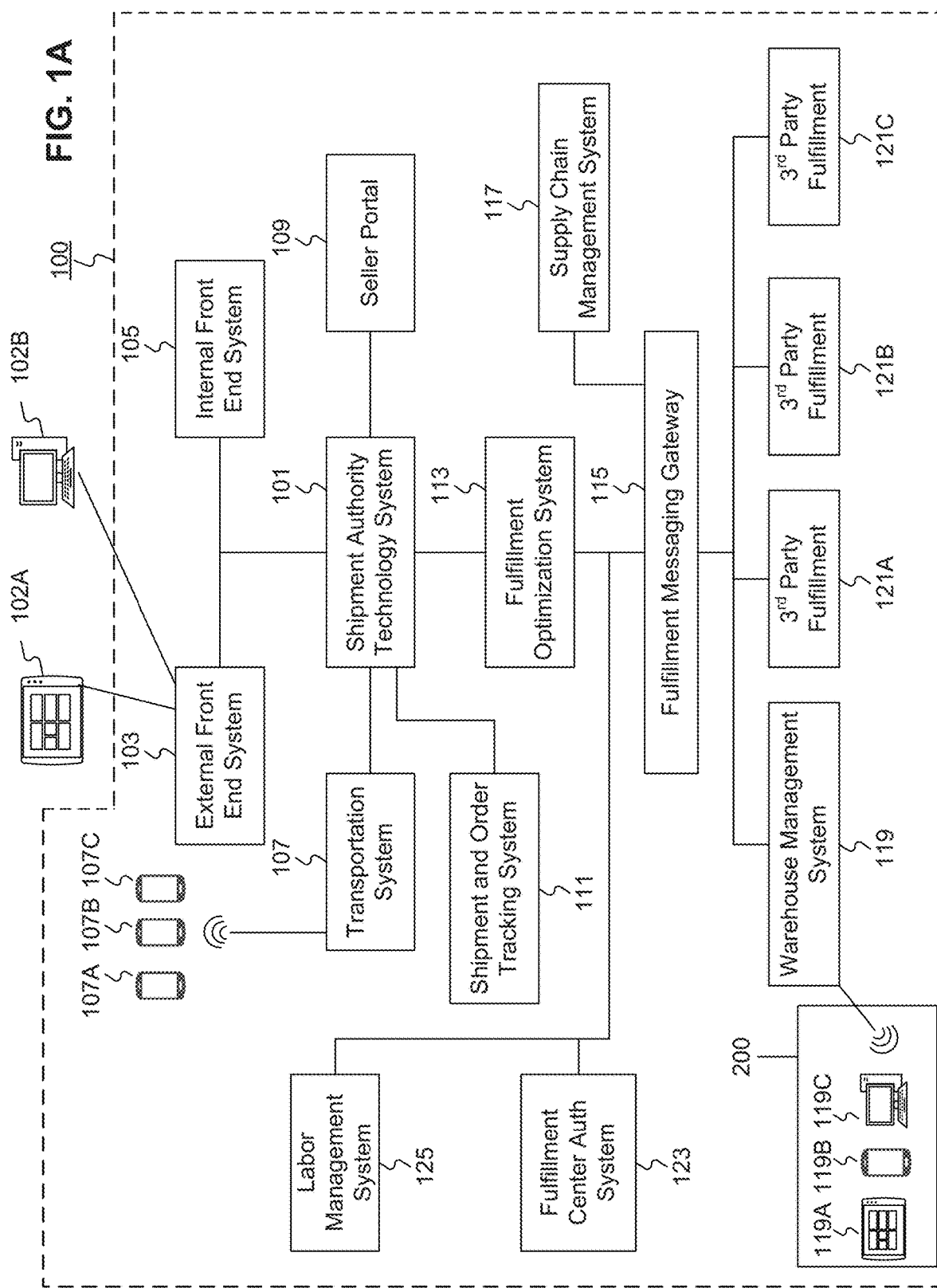
FIG. 1A is a schematic block diagram illustrating an exemplary embodiment of a network comprising computerized systems for communications enabling shipping, transportation, and logistics operations, consistent with the disclosed embodiments.
Figure 1C:
FIG. 1C depicts a sample Single Detail Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for reducing disk usage and network latency.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
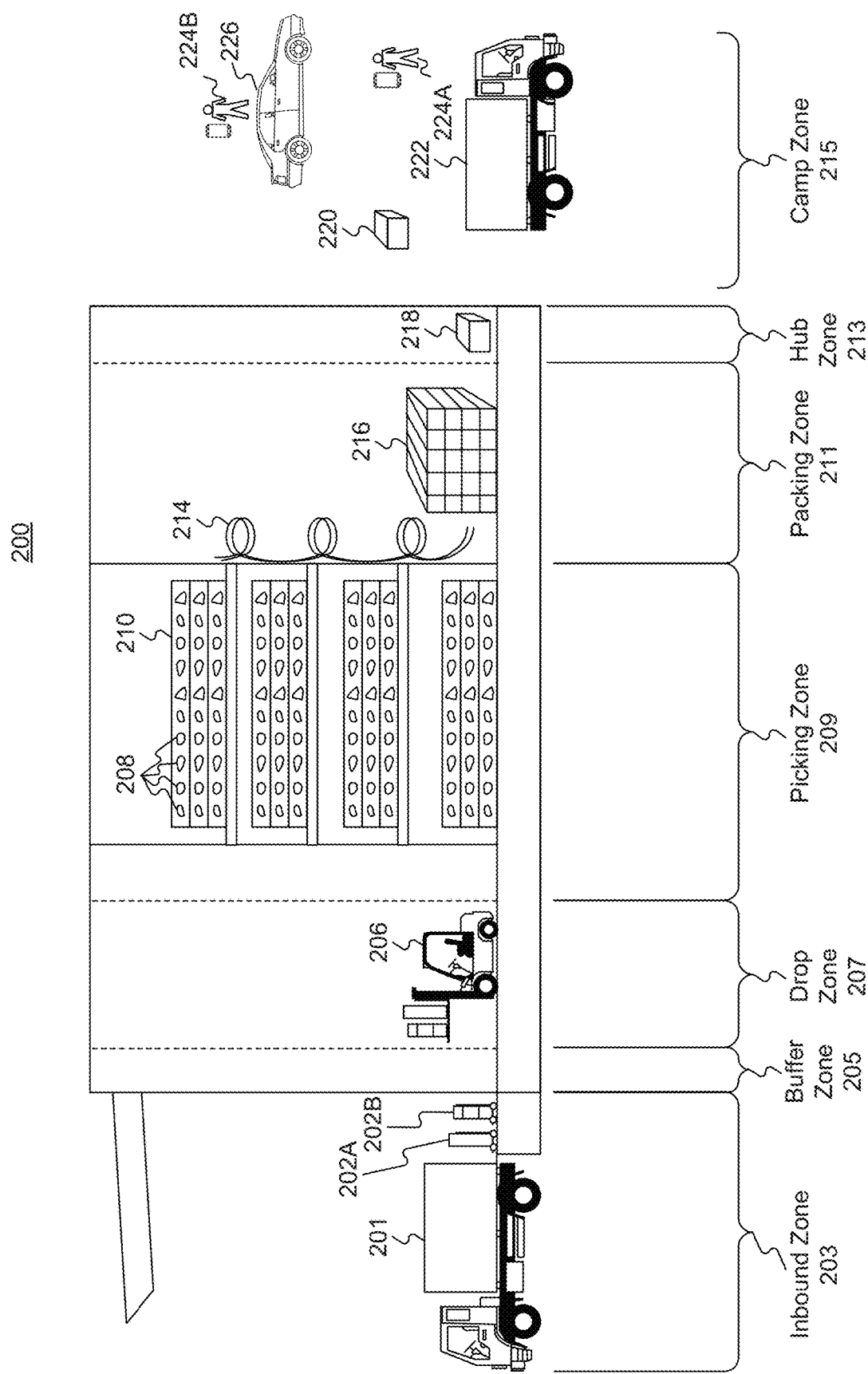
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119б.

Once a user places an order, a picker may receive an instruction on device 119б to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224б.

Figure 3:
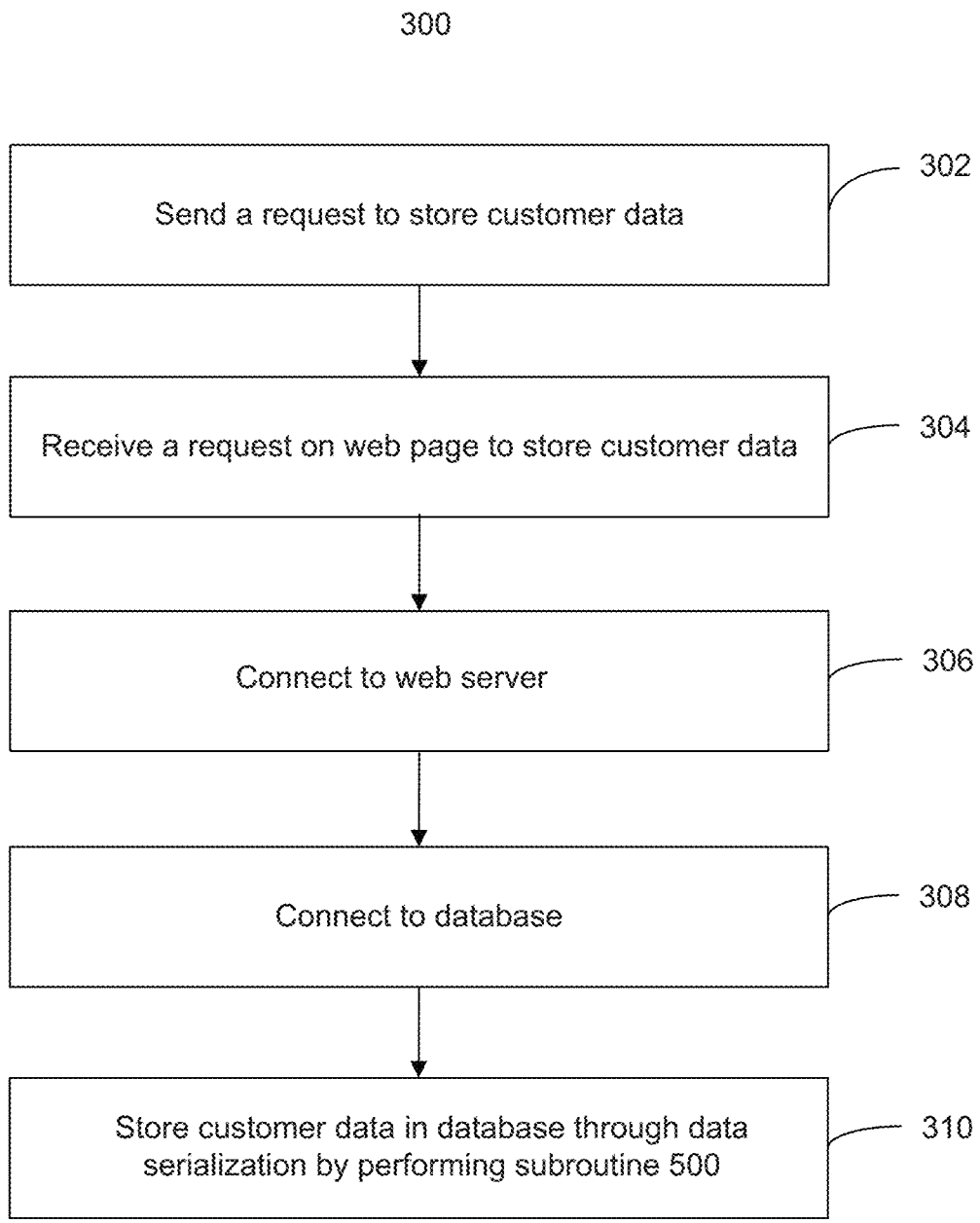
FIG. 3 is a flowchart illustrating an exemplary process for storing customer data to the database.

FIG. 3 illustrates an outline of the main process for storing the customer data. Customer data is data related to the customer and can include but is not limited to a customer's login information, user information, the number of products, price of products, or discounts. Process 300 begins at step 302 when a request is sent to store customer data from an external device (e.g., mobile device 102A or computer 102B). The request to store customer data can include but is not limited to a request to store the customer's login information, user information, products bought by the customer, and discounts applied by the customer. The request to store customer data could also include the price of the products bought by the customer.

Process 300 then proceeds to step 304. In step 304, the external front end system 103 receives a request to store customer data to the database. The request may be from a web page where a customer inputs information into a form, e.g., as in FIG. 1B, or an upload where customer data is uploaded to store to the database. To upload data into the database, a HTTP request may be made to an API, which can ingest the data into the system's operational database. The request may also consist of system-to-system communication where systems may communicate using various models. One common communication method is the client server model. In this model, a client requests the server to store data.

To store the customer data in the database, in step 306, the external front end system 103 connects to the web server located in the external front end system 103. The external front end system 103 connects to the web server by making an HTTP request to the web server. For example, in some embodiments, the client, e.g., a web browser, may make HTTP requests to the web server, where the web server will only respond to the client's HTTP request to store customer data.

Process 300 then proceeds to step 308. In step 308, the external front end system 103 connects to the database. In some embodiments, the web server connects to the database with a database connection. The database connections may require authentication to connect to the database. This database authentication process may confirm that a user who is attempting to log in to a database is authorized to do so, and is only accorded the rights to perform activities that the user has been authorized to perform. For example, a database connection may need to authenticate a customer's request to store customer data in the database by ensuring the customer is authorized to log in to the database.

After connecting to the database, process 300 proceeds to step 310. In step 310, the external front end system 103 stores the customer data in a serialized format by performing the subroutine 500 described in FIG. 5A. By serializing the data in a more efficient manner than the prior art, the external front end system 103 helps reduce disk usage.

Figure 4:
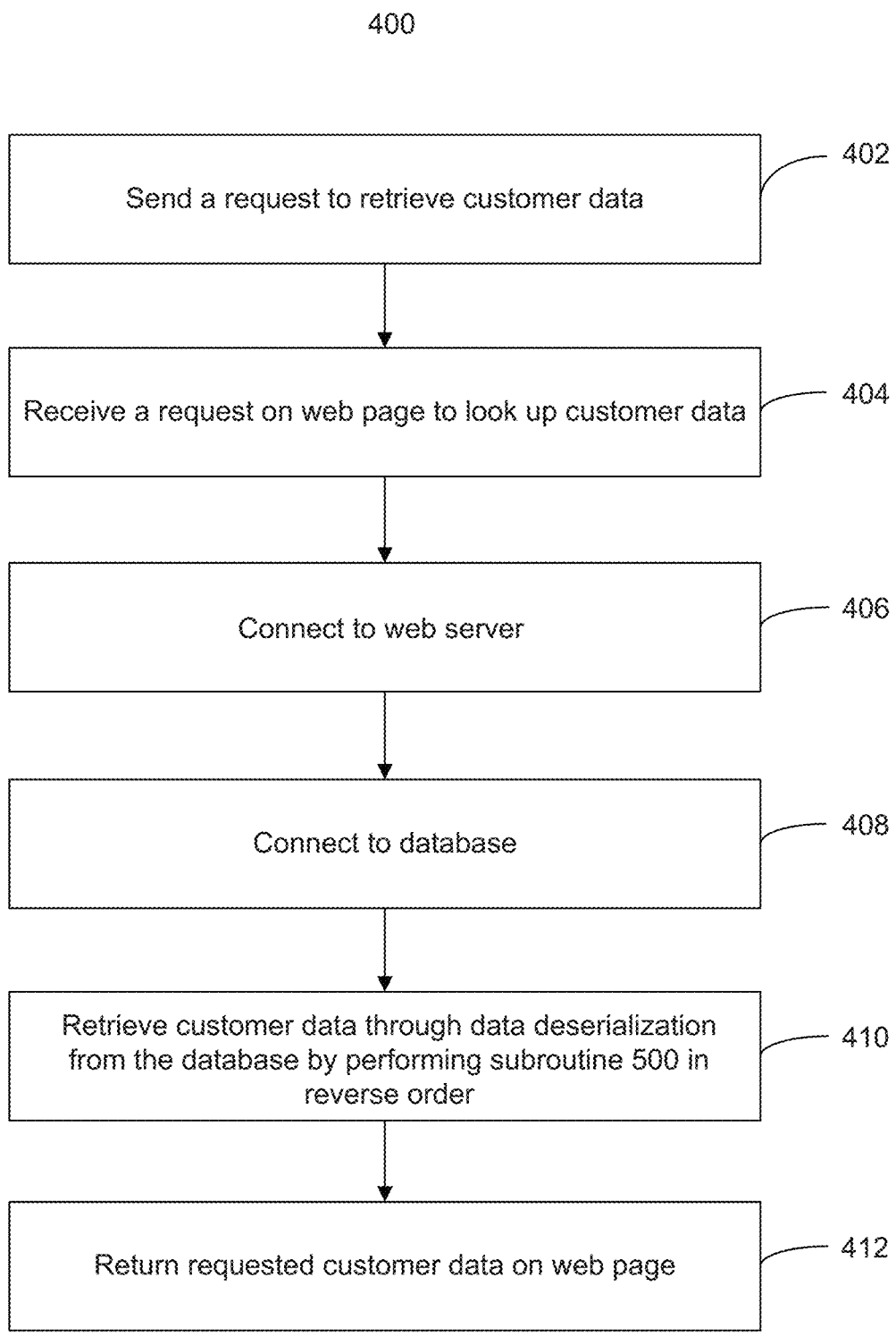
FIG. 4 is a flowchart illustrating an exemplary process for retrieving customer data from the database.

FIG. 4 illustrates an outline of the main process for retrieving the customer data from the database. Customer data, in some embodiments, is data related to the customer and can include but is not limited to a customer's login information, user information, the number of products, price of products, or discounts. Process 400 begins at step 402. In step 402, an external device sends a request to retrieve customer data from the external device (e.g., mobile device 102A or computer 102B). The request to retrieve customer data can include but is not limited to a request to retrieve the customer's login information, user information, products bought by the customer, and discounts applied by the customer. The request to retrieve customer data could also include the price of the products bought by the customer.

Process 400 then proceeds to step 404. In step 404, the external front end system 103 receives a request on a web page, as in FIG. 1B, to retrieve customer data from the database. The request may be from a web page where a customer inputs information into a form, e.g., as in FIG. 1B, or a download where customer data is downloaded from the database to return to the customer. To download data from the database, a HTTP request may be made to an API, which can retrieve the data from the system's operational database. The request may also consist of system-to-system communication where systems may communicate using various models. One common communication method is the client server model. In this model, a client requests the server to retrieve data.

To retrieve the customer data in the database, in step 406, the external front end system 103 connects to the web server located in the external front end system 103. The external front end system 103 connects to the web server by making an HTTP request to the web server. For example, the client, e.g. a web browser, may make HTTP requests to the web server, where the web server will only respond to the client's HTTP request to retrieve customer data.

Process 400 then proceeds to step 408. In step 408, the external front end system 103 connects to the database. Here, in some embodiments, the web server connects to the database with a database connection. The database connections may require authentication to connect to the database. This database authentication process confirms that a user who is attempting to log in to a database is authorized to do so, and is only accorded the rights to perform activities that the user has been authorized to perform. For example, a database connection may need to authenticate a customer's request to retrieve customer data from the database by ensuring the customer is authorized to log in to the database.

After connecting to the database, process 400 proceeds to step 410. In step 410, the external front end system 103 retrieves the customer data by deserializing the data from the database. The external front end system 103 retrieves the customer data by performing subroutine 500 described in FIG. 5A in reverse order. The external front end system 103 performs subroutine 500 from step 532.

After deserializing the data, process 400 returns the requested customer data onto the web page of the external device (e.g., mobile device 102A or computer 102B). Process 400 may return the requested customer data by responding to a request from a web page. Process 400 may also return customer data by completing the download process and providing the downloaded customer information to the client, e.g. web browser. By deserializing the data in a more efficient manner than the prior art, the external front end system 103 helps reduce network latency.

Figure 5A:
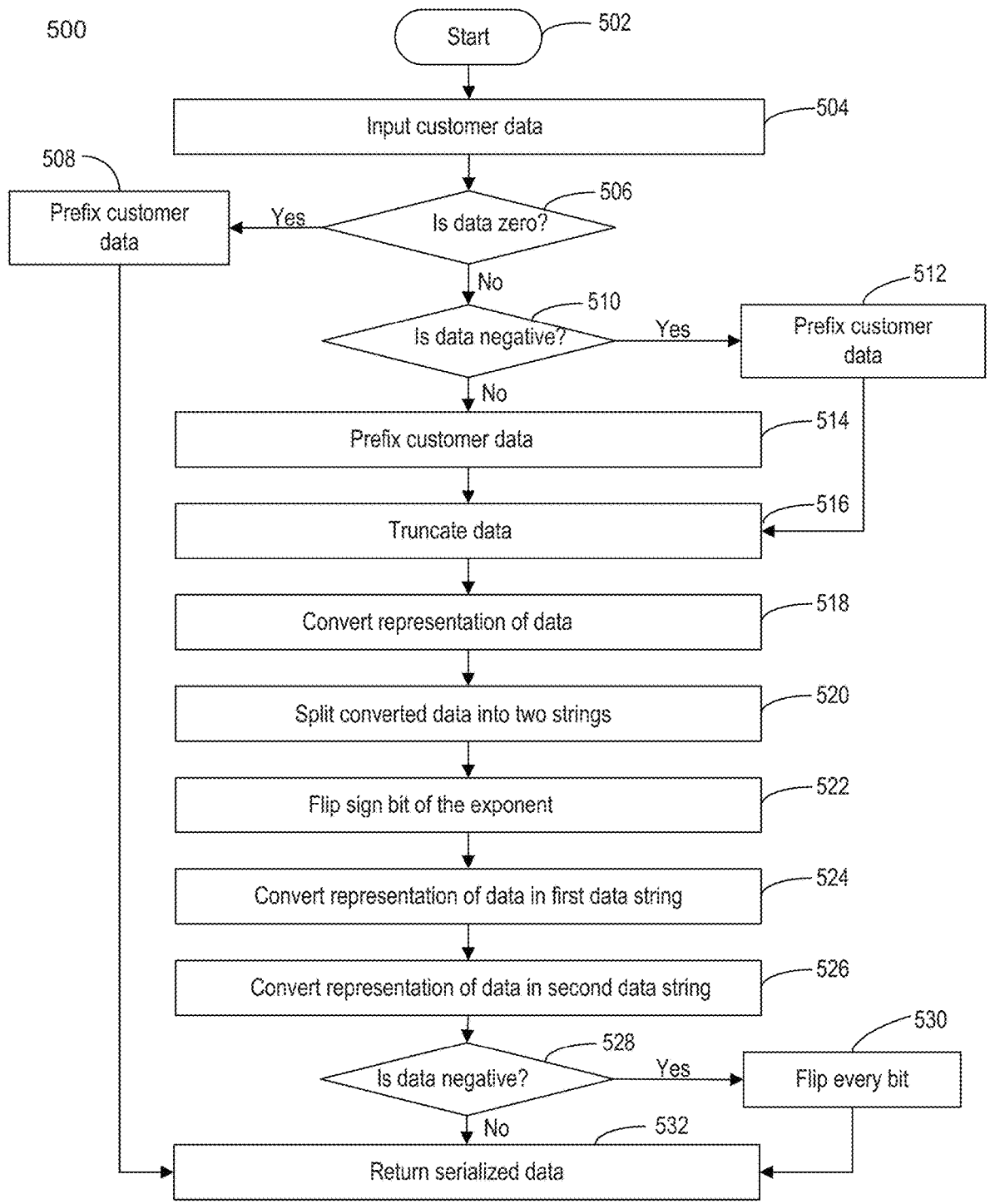
FIG. 5A is a flowchart illustrating an exemplary process for converting customer data into serialized data, consistent with the disclosed embodiments.

FIG. 5A illustrates a subroutine 500 of the main process performed by the external front end system 103 depicted in FIG. 1A. Specifically, in some embodiments, the subroutine is embedded in step 310 to store and in step 410 to retrieve customer data in the database through data serialization and deserialization, respectively. In other embodiments, subroutine 500 may be performed after one or more steps in FIGS. 3 and 4 (e.g., steps 310 and 410, respectively). FIG. 5B illustrates examples of certain steps of subroutine 500.

The process begins at step 504. In step 504, the external front end system 103 receives the input customer data and proceeds to step 506. In step 506, the external front end system 103 determines whether the input customer data is equal to the number value of zero. For example, the customer data, 0, would be equal to the number value of zero according to subroutine 500. If the customer data is zero, the external front end system 103 moves to step 508 and prefixes the customer data. The external front end system 103 may prefix the customer data with a hex byte to differentiate from customer data with numerical values that do not equal to the numerical value of 0. For example, if the customer data consisted of the number, 0, the external front end system 103 may prefix the customer data with hex byte "0x0E". If the customer data does not equal to a number value of zero, subroutine 500 proceeds to step 510.

In step 510, the external front end system 103 determines whether the customer data is a negative number. A negative number is a number below the numerical value zero. For example, the number, −24, is a negative number because it is less than the numerical value, 0. If the customer data is zero, the external front end system 103 moves to step 512 and prefixes the customer data. The external front end system 103 may prefix the customer data with a hex byte to differentiate from customer data with numerical values that are not less than zero. For example, if the customer data consisted of the number, −765, the external front end system 103 may prefix the customer data with hex byte "0x0D". If the customer data does not equal to a number value less than zero, the external front end system 103, subroutine 500 proceeds to step 514.

In step 514, the external front end system 103 prefixes the customer data if the data is not negative. For example, the number, 10, is not a negative number because it is greater than the numerical value, 0. The external front end system 103 may prefix the customer data with a hex byte to differentiate from customer data with numerical values that are not greater than the numerical value, 0. Since the number, 10, is not a negative number, for example, the external front end system 103 may prefix the customer data with hex byte "0x0F". Subroutine 500 then proceeds to step 516, In step 516, the external front end system 103 may condition the data by truncating the customer data by removing any leading and trailing zeros from the customer data. This step does not remove any leading and trailing zeros from the prefixed hex byte. By way of example as illustrated in FIG. 5B, the actual number in box 534, "0.123000", is truncated to "0.123" in box 536. Subroutine 500 then proceeds to step 518.

In step 518, the external front end system 103 formats the customer data by converting the customer data into a scientific notation format. By way of example as illustrated in FIG. 5B, box 538 illustrates the numbers from box 536 in a scientific notation format. By way of example as illustrated in FIG. 5B, box 538 contains −128. In box 538, this number is converted into scientific notation and results in the format, $-1.28\times10^2$. By way of another example as illustrated in FIG. 5B, box 538 contains 123. In box 538, this number is converted into scientific notation and results in the new format, $1.23\times10^{-1}$. The external front end system 103 converts this representation in order to aid in the next step, step 520.

In step 520, the external front end system 103 splits the customer data into two data strings, wherein the data strings may be binary strings. The first data string contains the exponent value of the customer data and the second data string contains the coefficient value of the customer data. By way of example as illustrated in FIG. 5B, box 538 contains $-1.28\times10^2$. In box 540, the value in box 538 is split into two data strings. After splitting, the first data string contains the value 2 and the second data string contains the value 1.28. By way of another example as illustrated in FIG. 5B, box 538 contains $1.23\times10^{-1}$. In box 540, the value in box 540 is split into two data strings. The first data string contains the value −1 and the second data string contains the value 1.23.

Process 500 then proceeds to step 522. In step 522, the external front end system 103 flips only the sign bit of the first data string. For example, the external front end system 103 may flip only the sign bit of the first data string by performing an XOR operation. The XOR operation may be performed with binary number 10000000 if the first data string is represented in the twos complement numerical format. By way of example as illustrated in FIG. 5B, box 542 illustrates how the exponent from box 540 is expressed in binary form in twos complement Box 542 illustrates the first string value, 2, in two's complement, 0b00000010, and performs an XOR operation with 0b10000000, which results in a flipped sign bit, 0b10000010. By way of another example as illustrated in FIG. 5B, box 542 illustrates the first string value, −1, in two's complement, 0b11111111, and performs an XOR operation with 0b10000000, which results in a flipped sign bit, 0b01111111. Process 500 then proceeds to step 524.

In step 524, the external front end system 103 converts the representation of data in the first data string. The external front end system 103 converts the first string from binary notation into hexadecimal notation. By way of example as illustrated in FIG. 5B, box 542 illustrates 0b10000010. In box 544, this binary string of 0b10000010 is converted to 0x82. By way of another example as illustrated in FIG. 5B, box 542 illustrates 0b01111111. In box 544, this binary string of 0b01111111 is converted to 0x7F.

Process 500 then proceeds to step 526. In step 526, the external front end system 103 converts representation of the data in the second data string. The external front end system 103 converts representation by representing every two digits of the second data string with one byte and returns the value in hexadecimal notation. By way of example as illustrated in FIG. 5B, box 540 illustrates a coefficient of "1.28". In box 544, the coefficient value in the second data string is encoded to illustrate "0x01 0x1c", where 0x01 represents the value 1 in "1.28" and 0x1c represents 28 in "1.28".

Process 500 then proceeds to step 528. In step 528, the external front end system 103 determines whether the input customer data from step 504 is of a negative value. Customer data is of negative value if the input customer data is less than the numerical value, 0. If the customer data is of a negative value in step 504, then the external front end system 103 flips every bit in the first and second data string and returns the serialized data in step 532. By way of example as illustrated in FIG. 5B, box 534 shows a number of negative value, "−128". Therefore, the external front end system 103 flips every bit of the first and second data string, containing the exponent and coefficient values, and returns the serialized data as illustrated in box 548. If the data is not of negative value in step 504, the external front end system 103 then returns the serialized data to store in the database in step 532. By way of example as illustrated in FIG. 5B, box 534 also shows a number of positive value, "0.123000". Since this is a number of positive value, the external front end system 103 does not perform step 530 on the first and second data strings. Instead, the external front end system 103 then returns the serialized data containing the prefixed hex byte and the encoded first and second data strings in box 548.

In some embodiments, the serialized data stored in step 310 from step 532 is a hexadecimal value and a different format than the customer data format in step 504. By way of example as illustrated in FIG. 5B, box 534 illustrates the actual number, −128. In box 548, the serialization process converts the actual number to 0x0d 0x7d 0xfe 0xe3. In other embodiments, the input customer data in step 504 may represent a name in alphabetical value instead of a numerical value. In these embodiments, the external front end system 103 may represent and store the alphabetical value in ASCII or Unicode in the database. By storing using different encoding standards, the database may store a variety of customer data relating to a customer.

The serialized data in step 532 corresponds to the length of the conditioned data, because the length corresponds to the number after the leading and trailing zeros are removed. The serialized data is also of variable length depending on the number of digits in the conditioned customer data. This variable length enables the customer data to maintain precision during the storage and retrieval process from the database.

Process 500 also helps illustrate how the customer data is retrieved from the database in step 410 through deserialization. To retrieve customer data by deserializing data in step 410 from the database, process 500 is performed in the reverse order. To retrieve customer data, the external front end system 103 performs the deserialization process by starting with step 532 and performs the steps in reverse order to step 504. Process 500 for serialization and deserialization helps the main process 300 reduce disk usage when storing the customer data and helps the main process 400 reduce network latency when retrieving the customer data.

FIG. 6 illustrates the test data results in disk usage and network latency using data serialization to store and retrieve customer data compared to the mechanisms used in a standard system. This test included a dataset size of 1 million records and performed a total number of 1 million scan requests. In Table 600, box 602 shows the 99.9% latency percentile, where 99.9% of the requests to store and retrieve the customer data will be faster than the given number. With the standard system, 99.9% of the requests to store and retrieve the customer data in this test were faster than 11.5 milliseconds. However, 99.9% of the requests to store and retrieve the same customer data were faster than 8.7 milliseconds with the serialization method. Therefore, box 602 illustrated a 24% decrease in network latency.

In box 604, Table 600 shows the 99.99% latency percentile, where 99.99% the requests to store and retrieve the customer data will be faster than the given number. With the standard system, 99.9% of the requests to store and retrieve the customer data in this test were faster than 50.3 milliseconds. However, 99.9% of the requests to store and retrieve the same customer data were faster than 34.7 milliseconds with the serialization method. Therefore, box 604 shows a 31% decrease in network latency.

Table 600 also illustrates the decrease in disk usage. In box 606, Table 600 shows the difference in disk usage by storing in the standard system and by storing with serialization in this improved system. In box 606, the standard system used 249 mebibytes (MiB) to store customer data. The improved system, however, used only 91.7 MiB to store the same input customer data. Therefore, box 606 illustrates a 63% decrease in disk usage when storing the same customer data.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for reducing disk usage and network latency, the system comprising:
   a memory storing instructions; and
   at least one processor configured to execute the instructions to:
   receiving customer data of a customer to store in a database;
   conditioning the customer data;
   formatting the conditioned customer data into first and second data strings respectively having a first data type and a second data type;
   flipping a sign bit of the first data string;
   converting representation of the sign-bit-flipped first data string and second data string into serialized data by representing every two digits of the first string with one byte;
   flipping all bits of the serialized data, if the received customer data is represented by a negative value;
   storing, after flipping if negative, the serialized data in the database;
   receiving a request for the customer data;
   deserializing serialized data to be retrieved from the database; and
   retrieving the deserialized data from the database.

2. The system of claim 1, wherein the customer data identifies data related to a customer.

3. The system of claim 2, wherein the data related to a customer comprises of customer user information, login information, discount information, and price information.

4. The system of claim 1, wherein conditioning the customer data comprises prefixing the customer data.

5. The system of claim 3, wherein the prefixing comprises prefixing the customer data with a hex byte.

6. The system of claim 1, wherein conditioning the customer data comprises removing any leading and trailing zeros.

7. The system of claim 1, wherein the request to store customer data comprises storing the customer's login information, user information, product information, discount information, and price information.

8. The system of claim 7, wherein the customer request to retrieve customer data comprises retrieving the customer's login information, user information, product information, discount information, and price information.

9. The system of claim 1, wherein the serialized data corresponds to the length of the conditioned customer data and is of variable length.

10. The system of claim 1, wherein retrieving the deserialized data from the database comprises performing the steps of serializing the data in reverse order.

11. A computer-implemented method for reducing disk usage and network latency, the method comprising:
   receiving customer data of a customer to store in a database;
   conditioning the customer data;
   formatting the conditioned customer data into first and second data strings respectively having a first data type and a second data type;
   flipping a sign bit of the first data string;

converting representation of the sign-bit-flipped first data string and second data string into serialized data by representing every two digits of the first string with one byte;

flipping all bits of the serialized data, if the received customer data is represented by a negative value;

storing, after flipping if negative, the serialized data in the database;

receiving a request for the customer data;

deserializing serialized data to be retrieved from the database; and retrieving the deserialized data from the database.

12. The method of claim 11, wherein the customer data identifies data related to a customer.

13. The method of claim 12, wherein the data related to a customer comprises of customer user information, login information, discount information, and price information.

14. The method of claim 11, wherein conditioning the customer data comprises prefixing the customer data.

15. The method of claim 13, wherein the prefixing comprises prefixing the customer data with a hex byte.

16. The method of claim 11, wherein conditioning the customer data comprises removing any leading and trailing zeros.

17. The method of claim 11, wherein the request to store customer data comprises storing the customer's login information, user information, product information, discount information, and price information.

18. The method of claim 17, wherein the customer request to retrieve customer data comprises retrieving the customer's login information, user information, product information, discount information, and price information.

19. The method of claim 11, wherein the serialized data corresponds to the length of the conditioned customer data and is of variable length.

20. A computer-implemented system for reducing disk usage and network latency, the system comprising:

receiving customer data of a customer to store in and retrieve from a database, the customer data comprising customer user information, login information, discount information, and price information;

conditioning the customer data by:
prefixing the customer data, and
removing any leading and trailing zeros;

formatting the conditioned customer data into first and second data strings respectively having a first data type and a second data type;

flipping a sign bit of the first data string;

converting representation of the sign-bit-flipped first data string and second data string into serialized data by representing every two digits of the first string with one byte;

flipping all bits of the serialized data, if the received customer data is represented by a negative value;

storing, after flipping if negative, the serialized data in the database;

receiving a request for the customer data;

deserializing serialized data to be retrieved from the database; and retrieving the deserialized data from the database.

* * * * *